A. B. COFFIN.
AUTOMATIC CLUTCH RELEASE FOR TRACTORS.
APPLICATION FILED JUNE 1, 1921.
1,438,096.
Patented Dec. 5, 1922.
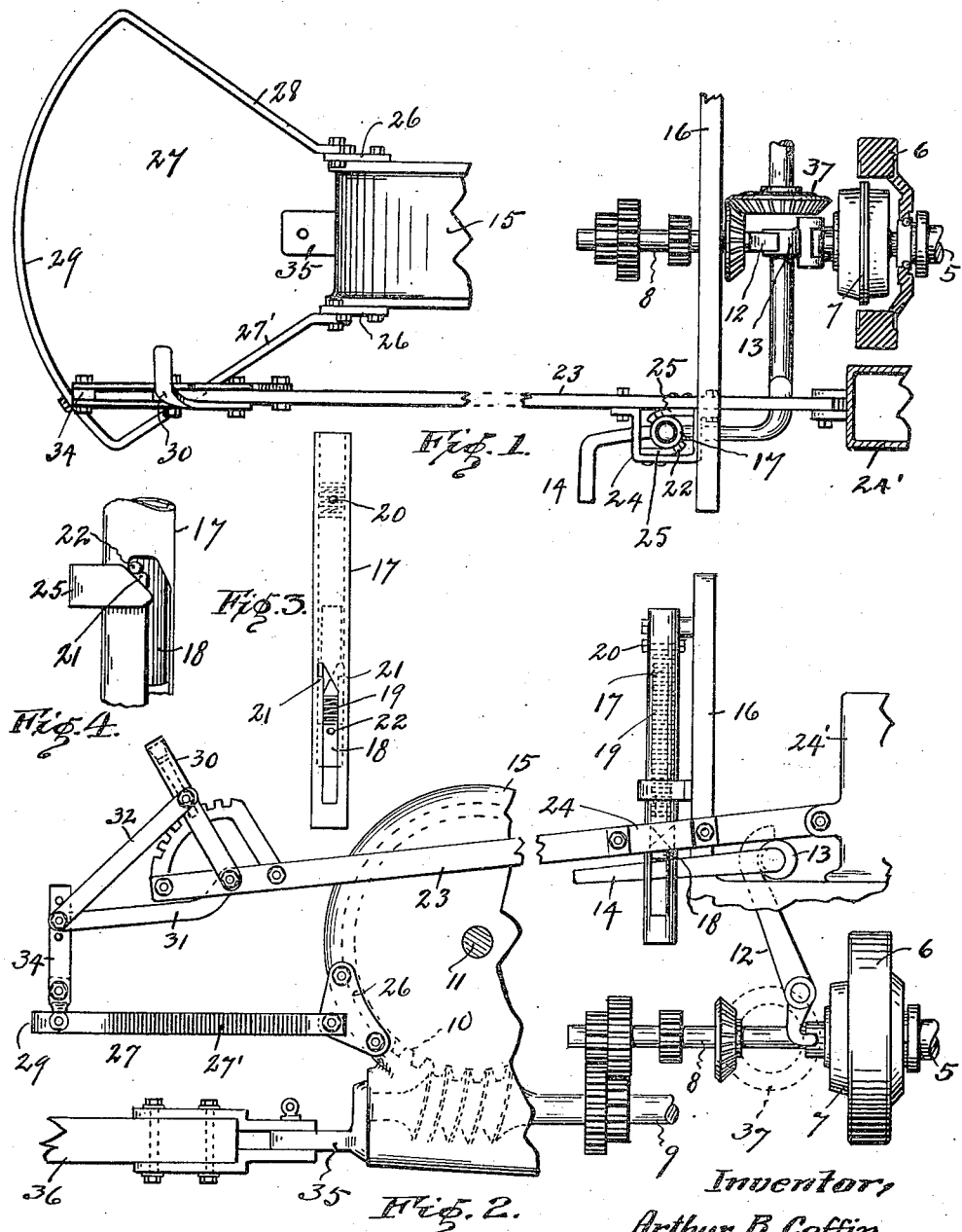
Inventor,
Arthur B. Coffin,
By Joseph A. Minturn
Attorney Patented Dec. 5, 1922.

1,438,096

UNITED STATES PATENT OFFICE.

ARTHUR B. COFFIN, OF SPICELAND, INDIANA.

AUTOMATIC CLUTCH RELEASE FOR TRACTORS.

Application filed June 1, 1921. Serial No. 474,135.

*To all whom it may concern:*

Be it known that I, ARTHUR B. COFFIN, a citizen of the United States, residing at Spiceland, in the county of Henry and State of Indiana, have invented new and useful Improvements in Automatic Clutch Releases for Tractors, of which the following is a specification.

Many accidents have occurred in the use of tractors by reason of the driving gear climbing the driven one when the machine reaches an obstruction, such as a boulder or wet ground in plowing, and the like, which turns the machine over and sometimes causes injury or death to the driver caught beneath the machine.

The object of this invention is to automatically disconnect the engine from the mechanism for moving the traction wheels, and a further object is to provide automatic means for unclutching the engine from the power transmission mechanism when the tractor is supplying power as a stationary engine and an overload starts the driving gear to climbing.

I accomplish the above and other objects which will hereinafter appear, by the mechanism illustrated in the accompanying drawing, in which:—

Fig. 1, is a top plan view of my invention and enough of the tractor mechanism to show the manner of assembly. Fig. 2 is a view of the same mechanism in side elevation. Fig. 3 is a detached view on a larger scale of the spring-lowered plunger and plunger-tube showing the plunger-slots in the tube, and Fig. 4 is a fragment on a still larger scale of the tube showing the plunger in upper locked position and cam for releasing the plunger.

Like characters of reference indicate like parts in the several views of the drawing.

On the engine shaft 5, is a flywheel 6 surrounding a friction clutch 7 through which power is transmitted to an upper transmission shaft 8, and from it through suitable gears to the worm shaft 9. The worm on shaft 9 engages a worm-wheel 10, on the axle 11 (see Fig. 2) and it is the climbing of the worm 9 on wheel 10 that causes the accidents which it is the purpose of this invention to avoid by automatically operating the clutch. This clutch 7 is operated by a lever 12 which in turn is moved by a cam 13 on the shaft of a clutch pedal 14. All of the above described mechanism except the clutch pedal itself, is contained within a housing 15, and is of well-known construction. The pedal, as heretofore, extends outside of the housing for manipulation by the driver's foot, and it is so arranged that pressure which lowers the clutch pedal will thereby open the clutch and disconnect the engine-shaft from the transmission-shaft. My invention contemplates means for automatically lowering the clutch pedal when the crawling movement of the worm about its gear has raised the associated parts of the tractor to or above a predetermined elevation.

Secured in a fixed manner to the dash 16 is a cylindrical tube 17 which forms the guide for a cylindrical plunger 18. The plunger has a reduced upper portion so formed as to enter the lower end of a spirally wound spring 19. The upper end of spring 19 is held by a cross-bolt 20 which passes through the tube diametrically and through the upper turns of the spring; whereby the latter will act as a compression spring to normally force the plunger in a downward direction. The lower opposite walls of the tube 17 have longitudinal slots with lateral recesses at their upper ends, but in opposite sides of the two slots. These lateral recesses form shoulders 21 to support a pin 22 which passes diametrically through the plunger 18 and has its ends in the two longitudinal slots just described. The plunger 18 will normally be in a raised position with the ends of the pin 22 seated on the shoulders 21. This is accomplished manually by raising the plunger against the tension of spring 19, until the pin comes opposite the lateral extensions of the longitudinal slots, and the torsional action of the spring will sufficiently rotate the plunger to seat the ends of the pin on the shoulders 21.

The tube 17 has additional longitudinal slots through its opposite walls near its lower end for the passage of the crank-pedal therethrough in the manner shown in Figs. 1 and 2 below the plunger 18, and when the plunger 18 is locked in its normal elevated position as above described the clutch-pedal is also in its raised position or position in which the clutch is functioning to connect the engine shaft with the transmission shaft. However, when the plunger is released by shoulders 21 the expansion of spring 19 will contact the plunger against the clutch-pedal 14 with sufficient force to lower the pedal and open the clutch to disengage the engine.

A lever 23 has one of its ends pivotally attached to the gasoline-tank 24, or other suitable support. The lever passes the tube 17 and has a frame 24 surrounding the tube. Supported by the lever on one side of tube 17 and by frame 24 on the opposite side are the bars 25 having cam shaped ends as illustrated in Fig. 4, which are brought in close relation to the walls of the tube by suitably bending the ends of the bars in the manner shown in Fig. 1. The function of the two cams is to push the ends of the pin 22, which project into the path of the cams, off of the pin-supporting shoulders 21 when the lever 23 is moved in an upward direction for a suitable distance.

Bolted to each side of the housing 15 are the pivot-plates 26, and pivotally secured to the plates 26 is a frame 27, which is here shown as formed out of a metal bar having two members oblique to each other, 27' and 28 respectively, which support a curved connecting member 29. By this construction, the lateral extension of frame 27 on each side of housing 15, is increased, which is an advantage, because this frame contacts with the plow-beam, ground, or other object to start the automatic action of my device, and the range of operativeness is correspondingly increased.

The lever 23 is connected with the frame 27 in such manner as to cause the lever to be moved simultaneously with the frame 27, and as it is desirable to change the distance between the lever and frame, as when the load to be moved or the work to be done requires that frame 27 be higher than at other times, I provide a means for readily adjusting the distance between the frame and lever while maintaining a rigid connection. This comprises a lever 30 pivoted to the lever 23, and an extension from said lever 30 in the direction of the continuation of lever 23, which will be fixed and rigid relative to the lever 30. This comprises the two bars 31 and 32 which are pivoted together at one of the ends of each and the other end of lever 31 is held by the same bolt which pivots lever 30 to lever 23, while the corresponding end of bar 32 is bolted to lever 30 at a suitable distance from the pivotal point of said lever to form a brace with bar 31 to maintain the intersections of the two bars at a fixed point from lever 30. This point will be oscillated about the fulcrum of lever 30 when the lever is moved. A notched segment is bolted to lever 23 concentrically of the fulcrum of the lever 30 to engage with a locking pawl of usual construction carried by the lever 30.

Pivotally secured to the member 29 of frame 27 is a standard 34 having a series of holes for the passage therethrough of the bolt which joins the two bars 31 and 32, the series of holes being provided to enable the distance between the lever 23 and frame 27 to be adjusted.

Secured to the lower part of housing 15 is the usual draw-bar cap 35, to which a plow-beam 36 or any other load member is secured in the usual manner.

Shown in full lines in Fig. 1 and dotted lines in Fig. 2 is a beveled gear wheel 37 which is drivingly engaged with a corresponding wheel on the upper transmission shaft 8. On the other end of the shaft on which the gear wheel 37 is mounted, is a belt-pulley (not shown) from which power is taken for a variety of purposes when the tractor is used as a stationary power plant. Usually the wheel 37, its shaft and the pulley here mentioned are accessories to be placed when the tractor is to be used as a stationary power plant and which will be removed when the tractor is functioning as a tractor. My invention is of great utility and protection against accidents for the reason that it affords ready means for disconnecting the engine-shaft by a person taking hold of any part of the frame 27 or lever 23 and lifting up thereon until the cams on frames 24 release the plunger 18 by disengaging its pin 22 from the shoulders 21.

In the operation of my attachment when the machine is functioning as a tractor when the overturning of the machine has gone far enough to bring the frame 29 into contact with the plow-beam 36, or with the ground or any other arresting object, the frame will swing up thereby moving the lever 23, and when the dogs on bars 25 contact and push the ends of pin 22 off of their supporting shoulders the plunger 18 being thereby released is forced down by spring 19 against the cam pedal 14 moving the latter in a direction to cause its connected mechanism to open the clutch and disconnect the engine.

While I have here shown the best form of my device now known to me, it is capable of modification in many immaterial details, and I therefore do not desire to be limited to the mechanism shown, or any more than is required by the appended claims, and what I claim is—

1. In combination with a tractor provided with a clutch operating pedal, means comprising a lever pivoted to the tractor and adapted to be moved by contact of the means with an object externally of the tractor, and spring-actuated pedal-operating means normally disconnected from and not influencing the pedal but operatively contacting the pedal to open the clutch when released by a movement of the lever caused by contact of some part of the first means with an object externally of the tractor.

2. In combination with a tractor provided with a clutch-operating pedal, means comprising a lever pivoted to the tractor adapted to be moved by contact of the means with an object externally of the tractor, spring actuated means functioning as the result of the movement of the lever for moving the clutch-pedal, and means for varying the distance of the movement of the lever before it contacts an object externally of the tractor.

3. In a tractor, an engine shaft, an axle, a transmission shaft, means for transmitting power to the axle, a clutch connecting the engine shaft and transmission shaft, means comprising a clutch pedal for operating the clutch, means comprising a lever pivoted to the tractor and adapted to be moved by contact of the means with an object externally of the tractor, and spring actuated means set in operation by movement of the lever for moving the clutch pedal in a direction to disconnect the engine shaft and transmission shaft.

4. In a tractor, an engine shaft, an axle, a power transmission shaft, means for transmitting power from the last shaft to the axle, a clutch connecting the engine shaft and transmission shaft, means comprising a clutch pedal for operating the clutch, means comprising a lever pivoted to the tractor and adapted to be moved by contact of the means with an object externally of the tractor at a rotative movement of the tractor as a whole about said axle, and means set in operation by the movement of the lever for moving the clutch pedal to disconnect the engine and transmission shafts, said last means comprising a plunger, a spring pressing the plunger into contact with the pedal, means to hold the plunger against the tension of the spring out of contact with the lever and means carried by the lever to release the plunger.

5. In a tractor having a clutch pedal the movement of which disconnects the power from the operative parts of the tractor, the combination of said pedal, a lever pivoted to the tractor, a plunger having a reciprocating adjustment against the clutch pedal and away from it, a spring normally pressing the plunger against the pedal to move the latter, means to hold the plunger against the spring and away from the pedal, means carried by the lever for releasing the plunger when the lever is moved, said lever being adapted to be moved to release the plunger at a predetermined rotative movement of the tractor as a whole about its axle by contact of some part of the mechanism with an object externally of the tractor.

6. In a tractor, having a clutch pedal the movement of which disconnects the power from the operative parts of the tractor, the combination of said pedal, a lever pivoted to the tractor, a plunger having a reciprocating adjustment against and also away from the pedal, a spring pressing the plunger normally against the pedal, means to hold the plunger against the spring and away from the pedal, means carried by the lever for releasing the plunger when the lever is moved, said lever being adapted to move and release the plunger by contact of a frame with an object externally of the tractor upon a predetermined rotative movement of the tractor about its axle, and said frame pivoted to the tractor and extending laterally on each side of the lever and connected with the lever so it and the lever will move simultaneously.

Signed at Indianapolis, Indiana, this the 19th day of May, 1921.

ARTHUR B. COFFIN.